May 28, 1968
C. P. RICKERD ETAL
3,385,235
WAFERIZING MACHINE
Filed Oct. 25, 1966
3 Sheets-Sheet 1
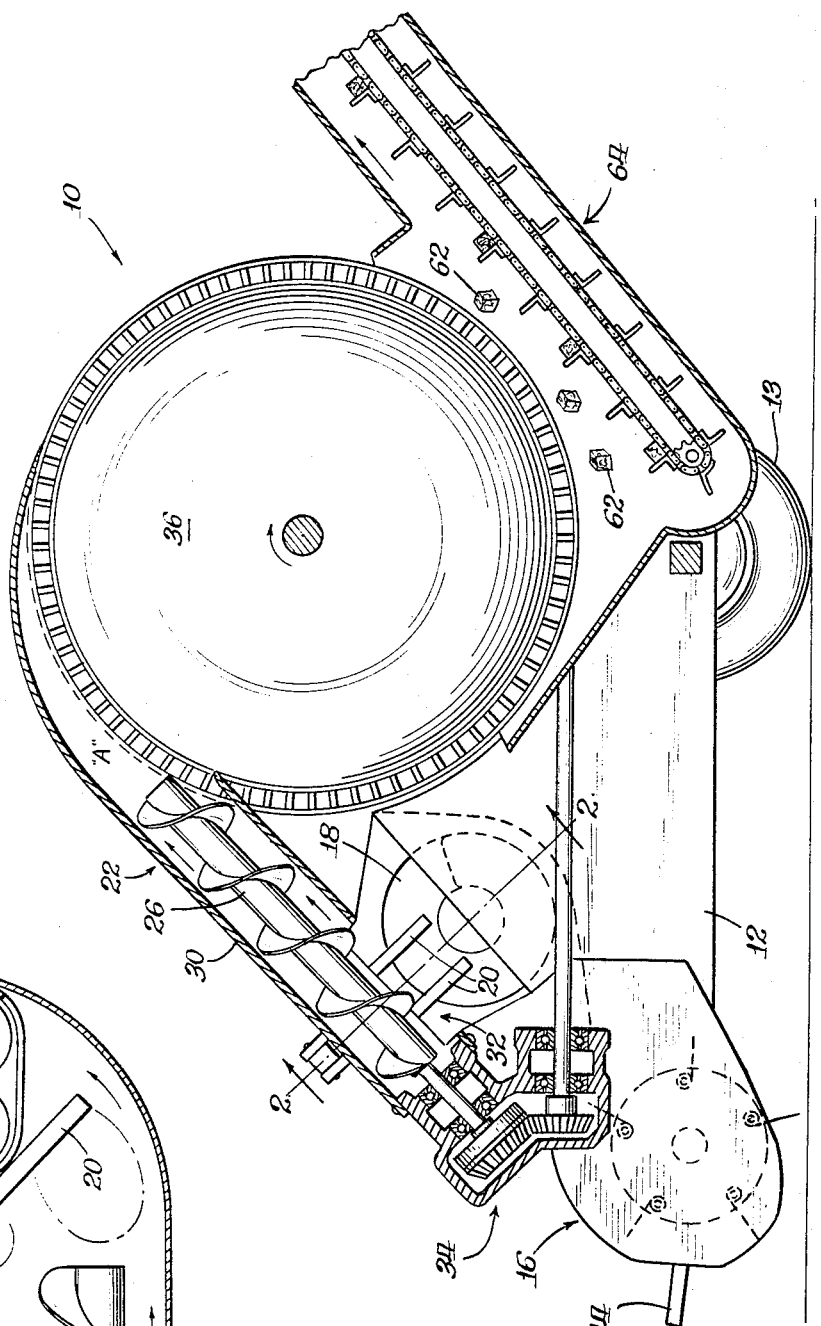
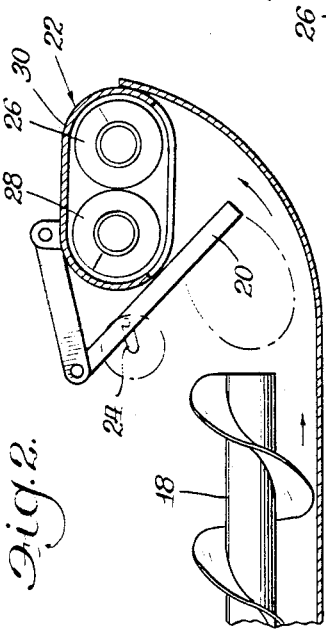
Inventors:
Calvin P. Rickerd
Edward Svereika
By Richard E. Bochnu Atty.

May 28, 1968     C. P. RICKERD ET AL     3,385,235
WAFERIZING MACHINE

Filed Oct. 25, 1966     3 Sheets-Sheet 2

Inventors:
Calvin P. Rickerd
Edward Svereika
By Richard E. Backus Atty.

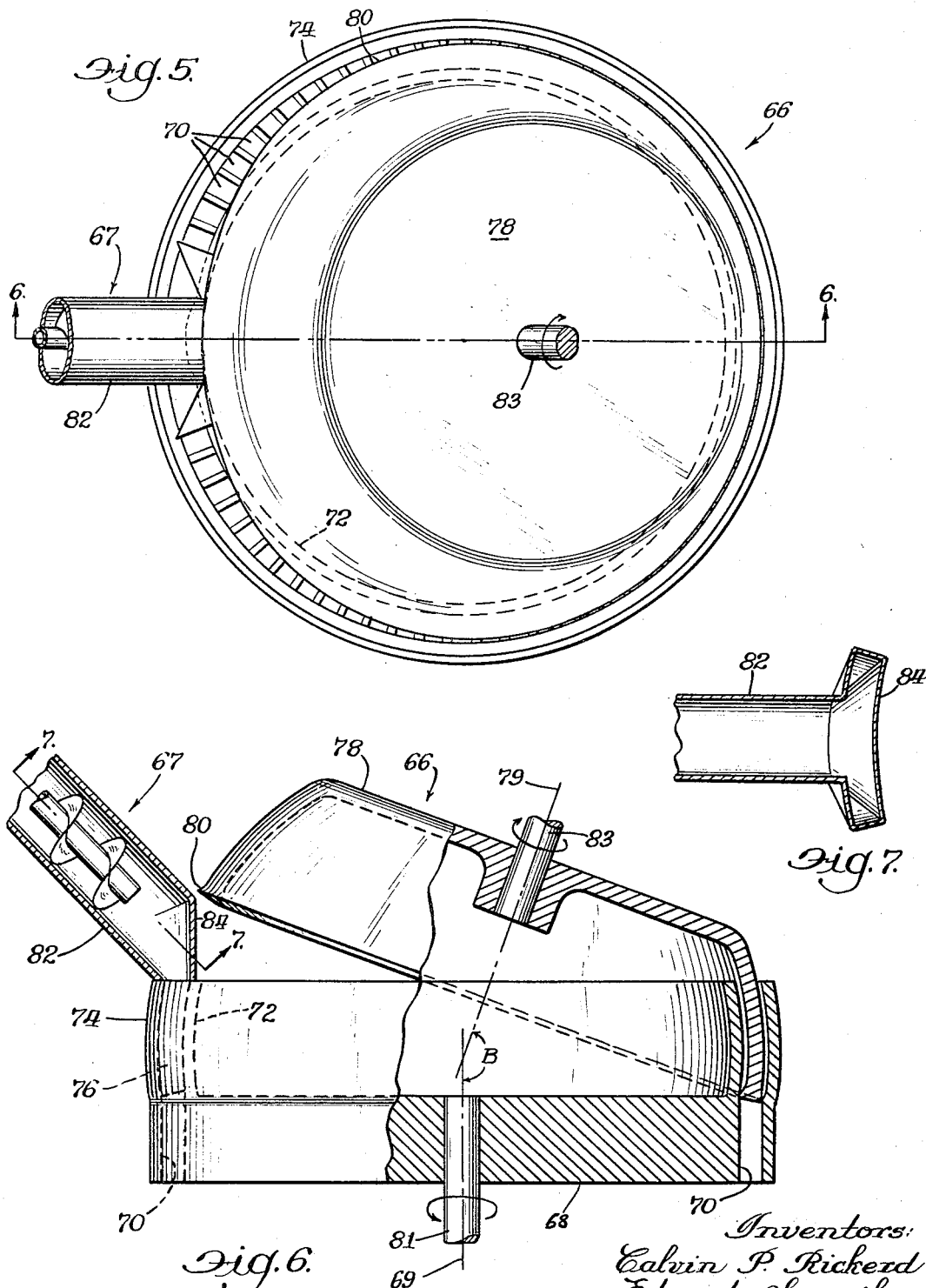

United States Patent Office 3,385,235
Patented May 28, 1968

3,385,235
WAFERIZING MACHINE
Calvin P. Rickerd, La Grange Park, and Edward Svereika, Chicago, Ill., assignors to International Harvester Company, Chicago, Ill., a corporation of Delaware
Filed Oct. 25, 1966, Ser. No. 589,438
7 Claims. (Cl. 107—14)

This invention relates generally to machines for wafering crop material, such as hay and the like, and more particularly relates to machines for forming crop material into wafers through operation of a novel pair of compactor wheels adapted for extruding the material through die openings.

Recent engineering designs in the crop material handling art have sought to provide a machine which will compact the material into wafers having a stable composition through the expenditure of a minimum amount of power. It has also been a goal to provide a wafering machine of simplified construction which will produce such wafers at a high output rate. Heretofore wafering machines have not been successful in these objectives because they involve complicated and expensive equipment having power requirements above those deemed economically feasible. Moreover, existing machines have not produced a stable product because the wafer tends to break up as it is formed.

Accordingly it is an object of this invention to provide a crop material wafering machine which produces wafers having a stable composition by means of a novel pair of compactor wheels requiring less power to operate as compared to existing machines.

It is another object of this invention to provide a material compacting machine incorporating a pair of compactor wheels in which the walls forming the material receiving chamber of the wheel carrying the die openings move in conjoint rotation with the wheel carrying the die press.

Another important object of the present invention is to provide a hay wafering machine incorporating a pair of compactor wheels in which the first wheel is provided with die openings and a pair of walls forming the material receiving chamber, each wall being formed in a spherical shell configuration, and in which the die press on the other wheel is formed in a spherical shell configuration and rotates within the chamber conjointly with and at an angle to the first wheel.

It is still another object of the present invention to provide a hay wafering machine comprising a pair of wheels rotatably mounted about converging axes in which the first wheel having a plurality of die openings is provided with inner and outer walls in spherical shell configuration and forming a channel for receiving the die press of the second wheel and in which the inner wall axially extends beyond the outer wall to define an opening therewith for receiving material into the channel.

These and other objects of the present invention will become apparent to those skilled in the art when the following specification is read in conjunction with the accompanying drawings, wherein:

FIGURE 1 is a side elevation view, partially in cross-section, illustrating a wafer forming machine incorporating features of the present invention;

FIGURE 2 is a cross-sectional view taken along the line 2—2 of FIGURE 1 illustrating component elements of the present invention;

FIGURE 5 is a side elevation view illustrating features of a modified form of the present invention;

FIGURE 6 is a side view partially in cross-section taken along the line 6—6 of the embodiment of FIGURE 5; and FIGURE 7 is a cross-sectional view of the conveyor housing of the modified form of the invention taken along the line 7—7 of FIGURE 6.

Figure 3:
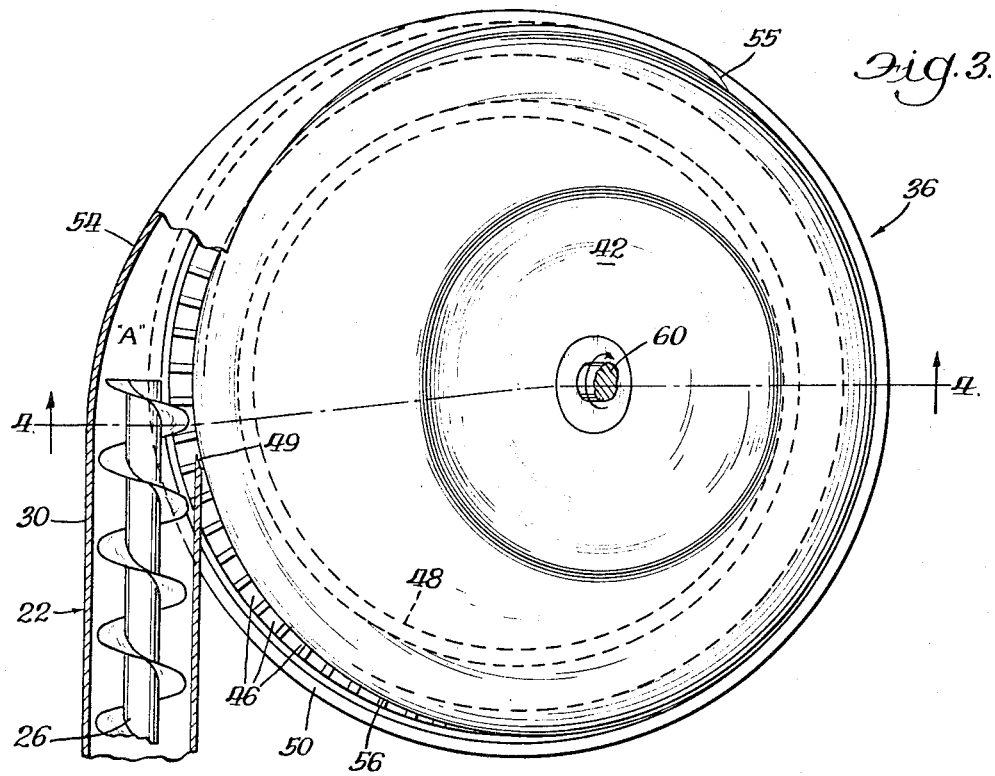
FIGURE 3 is a side elevation view, partially in cross-section, illustrating features of the conveyor and compactor assembly of the invention of FIGURES 1 and 2.

Referring now to the drawings and particularly FIGURE 1 the numeral 10 designates generally a wafer forming machine. The machine 10 comprises a main frame 12 supported by wheels 13 and pulled by tow bar 14 from a tractor (not shown). A conventional material gathering means 16 is provided at the front of frame 12 to feed the crop material upwardly into transversely disposed auger conveyor 18.

As illustrated in FIGURE 2 conveyor 18 moves the material to the left side of the machine where it is forced by means of packer fingers 20 into the auger conveyor 22. The fingers 20 are reciprocated through operation of a crank 24 powered through a conventional drive train (not shown).

The auger conveyor 22 comprises a pair of auger members 26 and 28 mounted in housing 30 which is open at its lower end 32 to receive material from the fingers 20. The auger members 26 and 28 are rotated through operation of a conventional drive train 34 driven from a prime mover (not shown) mounted on frame 12. As the material is fed into conveyor 22 it is moved upwardly through housing 30 where it is progressively compressed until it is discharged at zone A on the inlet side of the compactor assembly 36.

Figure 4:
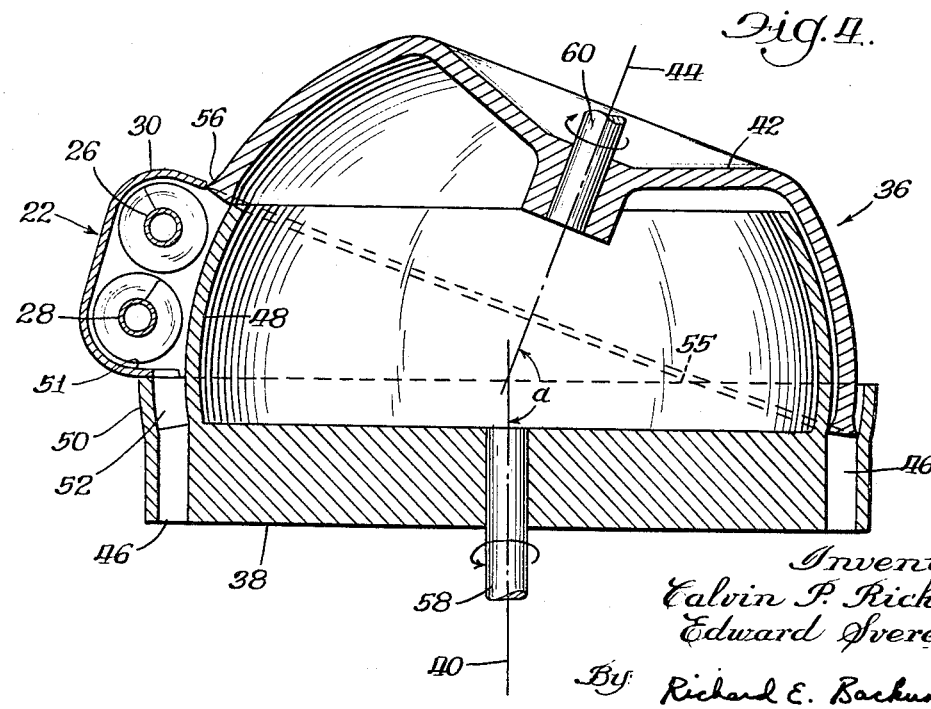
FIGURE 4 is a cross-sectional view taken along the line 4—4 of FIGURE 3.

Details of compactor assembly 36 and its connection with conveyor 22 are illustrated in FIGURES 3 and 4. The assembly 36 comprises platen wheel 38 and die press wheel 42 moving in conjoint rotation with their converging axes forming an angle $\alpha$ of less than 180°. Platen wheel 38 is rotatably mounted on frame 12 about axis 40 and die press wheel 42 is rotatably mounted on the frame about axis 44.

Platen wheel 38 is formed with a plurality of axially extending, circumferentially disposed die openings 46. The die openings 46 preferably are formed with a square cross sectional configuration, as illustrated in FIGURE 3, but may also be formed in other configurations, such as circular or rectangular. It has been found that with the square or rectangular configuration less resistance occurs during extrusion of the material. The result is that less power is required to operate the machine.

Inner wall 48 and outer wall 50 are formed integral with the platen wheel 38, each wall having a spherical shell configuration. The walls are concentrically positioned and radially spaced to form an annular channel 52 for guiding the material from conveyor 22 into the die openings. Inner wall 48 extends beyond platen wheel 38 into sliding contact with the open end 49 of conveyor housing 30. Outer wall 50 extends a shorter distance from the platen wheel into sliding contact with the lower side 51 of housing 30. A second housing 54 is formed in the shape of a tapered involute and extends from the discharge end of conveyor 22 along one side of compactor assembly 36 between wall 50 and wheel 42. The housing terminates at the junction 55 of die press end 56 and outer wall 50. Housing 54 serves to guide the material from the conveyor tangentially into the opening between the channel and die press end.

Die press wheel 42 is formed in a spherical shell configuration. Annular end 56 forms a die press adapted to axially slide along inner wall 48 into channel 52 to compact and extrude material through die openings 46.

The wheels of the compactor assembly are powered to move in conjoint rotation from the prime mover (not shown) which drives shaft 58 connected with platen wheel 38 and shaft 60 connected with die press wheel 42. As the wheels rotate together the end 56 of the die press axially moves to and from die openings 46. With the wheels rotating clockwise as viewed in FIGURE 3 a given point on end 56 adjacent the discharge end of conveyor 22 will advance towards the die openings and compress the material in zone A. At the same time the involute shape of housing 54 will act as a cam against the material to assist in its compression. Because the inner wall 48 is moving with die press wheel 42 lateral sliding friction of the material relative to the wall is eliminated. Some sliding friction will occur, however, between the material and the inner surface of stationary housing 54.

As the wheels rotate further end 56 of the die press enters channel 52 where it compacts the material and forces it into die openings 46. At this time both of the walls are moving with the die press thus entirely eliminating lateral wall friction. The friction of the walls of the die openings will resist movement of the material causing an increase in heat and pressure with the result that a wafered product having a high density will be extruded from the die openings.

In applicants' wafering machine the substantial reduction in lateral wall friction results in the requirement for less power to process the same amount of material as compared to conventional machines. Furthermore, the wafer produced with applicants' invention is more stable since elimination of most of this wall slippage reduces the chance of the wafer being broken up as it is compressed.

FIGURE 1 illustrates the completed wafers 62 as they drop from the compactor assembly onto elevator 64 for delivery to a suitable material transporting or storage means (not shown). It has been found that the wafers will break free from the die openings as they are extruded without the necessity of providing a blade or other cutting device.

FIGURES 5 and 6 illustrate a modified form of the present invention incorporating a compactor assembly 66 receiving compressed material from an auger conveyor 67. Compactor assembly 66 comprises a platen wheel 68 mounted for rotation about axis 69 and having a plurality of axially extending, circumferentially disposed die openings 70. Inner wall 72 and outer wall 74, each having a spherical shell configuration, are integral with wheel 68 and are radially spaced to form an annular channel 76 for guiding material from conveyor 67 into the die openings. Each of the walls 72 and 74 extend an equal axial distance from the die openings 70.

A die press wheel 78 having a spherical shell configuration is mounted for conjoint rotation with wheel 68 about an axis 79 forming an angle $\beta$ of less than 180° with axis 69. The annular end 80 of die press wheel 78 axially moves to and from the die openings within channel 76 throughout rotation of the wheels. The assembly 66 is driven from the prime mover by means of shaft 81 connected with wheel 68, and by shaft 83 connected with wheel 78.

The material delivered from conveyor 67 is guided into channel 76 by means of conveyor housing 82 having a flared end 84 (FIGURE 7). The housing end 84 is in sliding contact with the ends of walls 72 and 74 and delivers the material axially into the channel.

Following delivery of the material into channel 76 annular end 80 starts its compacting cycle after approximately 90° of revolution of the wheels. The material is then extruded through the die openings during continued wheel revolution. Since both walls 72 and 74 of the platen wheel rotate conjointly with the die press no transverse sliding friction will be developed. Thus the power requirements are greatly reduced and the chance of the material being broken up is minimized as compared to existing machines.

It will be understood that various changes in the details and arrangement of parts, which have been described and illustrated in order to explain the nature of the invention, may be made by those skilled in the art within the principle and scope of the invention as expressed in the appended claims.

What is claimed is:

1. In a machine of the character described for forming crop material into wafers, the combination of: a frame; a first wheel rotatably mounted on the frame about a first axis; a second wheel rotatably mounted on the frame about a second axis converging with the first axis at an angle of less than 180°; inner and outer concentric walls integral with the first wheel, the walls being radially spaced to form an annular channel for receiving material; the first wheel being formed with a plurality of axially extending die openings disposed between the walls; a die press integral with the second wheel, the die press having an annular end tangential at one side with the die openings and having its diametral opposite side spaced from the die openings; feed means to deliver the material into the channel substantially at said opposite side of the die press; and, means to move the first and second wheels in conjoint rotation to extrude the material in the channel through the die openings.

2. The invention as defined in claim 1 wherein the inner and outer walls extend substantially the same axial distance from the die openings.

3. The invention as defined in claim 2 wherein: the feed means comprises an auger to initially compact the material to a given density, the auger having an outlet; and, a housing connecting the auger outlet with the channel, the housing being positioned to deliver the compacted material axially into the channel.

4. The invention as defined in claim 1 wherein: the die openings are circumferentially spaced between the walls, each die opening having a rectangular configuration in transverse cross section.

5. The invention as defined in claim 1 wherein: the inner and outer walls are formed with a spherical shell configuration; and, the end of the die press is formed with a spherical shell configuration adapted to move to and from the die openings within the channel throughout said rotation of the wheels.

6. The invention as defined in claim 1 wherein the inner wall axially extends beyond the outer wall from the first wheel; and, the feed means comprises an auger having an outlet and a housing extending from said outlet to the channel between the die press and the second wheel, the housing being spaced from that portion of the inner wall extending beyond the outer wall and forming a material containing passageway therewith.

7. The invention as defined in claim 6 wherein the housing is formed with its outer surfaces tapered in the shape of an involute from the auger outlet to the junction of the end of the die press and the outer wall.

References Cited

UNITED STATES PATENTS

| 2,052,449 | 8/1936 | Connell | 107—8 |
| 2,059,486 | 11/1936 | Payne et al. | 107—8 |
| 3,105,434 | 10/1963 | Messing | 100—158 |

BILLY J. WILHITE, *Primary Examiner.*